Dec. 28, 1965  G. J. WOHNOUTKA  3,225,585
METHOD AND APPARATUS FOR MEASURING AIR IN HYDRAULIC SYSTEMS
Filed Feb. 28, 1963
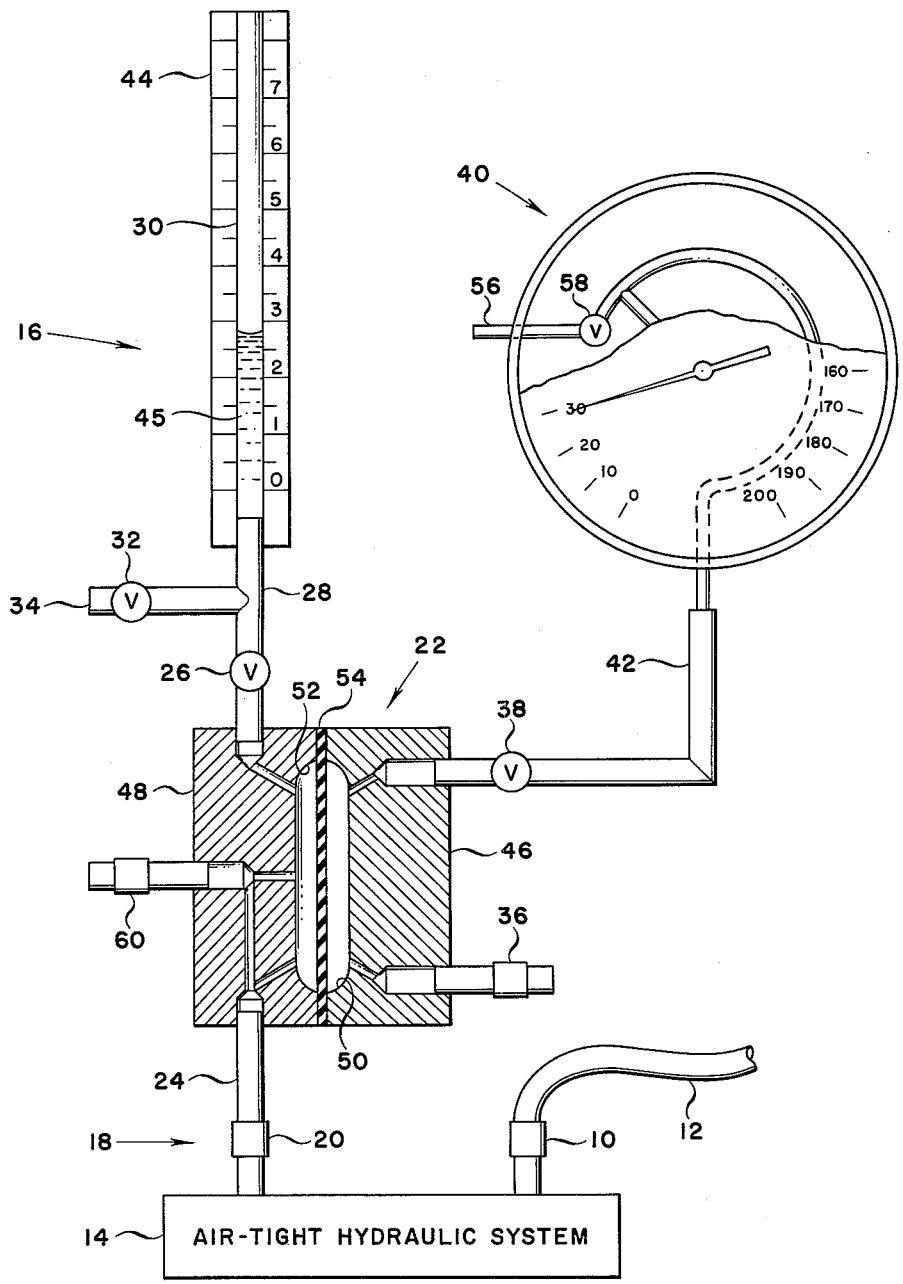
INVENTOR.
GEORGE J. WOHNOUTKA
BY
Agent

United States Patent Office 3,225,585
Patented Dec. 28, 1965

3,225,585
METHOD AND APPARATUS FOR MEASURING AIR IN HYDRAULIC SYSTEMS
George J. Wohnoutka, San Jose, Calif., assignor to Lockheed Aircraft Corporation, Los Angeles, Calif., a corporation of California
Filed Feb. 28, 1963, Ser. No. 261,702
6 Claims. (Cl. 73—19)

This invention relates to a method and apparatus for measuring air in hydraulic systems and more particularly to an apparatus for measuring air in hydraulic systems having a pressure gauge connected to one branch thereof and a volume measuring device connected to the other branch thereof for readily determining the volume of air included in closed hydraulic systems.

At the present time, considerable effort is being expended in the development of missiles for military and space exploration having self-contained control centers and guidance systems which are actuated by closed hydraulic systems. In the instance of the military missile, it has become extremely important that they have a guidance system which is operable at all times in order to be as effective as possible. In this connection, it has been found that the presence of air within the closed hydraulic system may cause the missile to malfunction, thereby creating a potential hazard to the user and to the population of countries friendly to the user.

The use of closed hydraulic systems in other modern day machinery used for non-military purposes, such as the commercial airplane, automobiles, trucks, hydraulic presses and the like, is also quite extensive. The presence of air in these systems has also produced an undesirable condition in that the system may malfunction and thereby cause malfunctioning of the apparatus or accidents which involve the lives of many people. For example, the presence of air in a hydraulic system of a commercial airplane may be responsible for the failure of landing gears in that they are not raised or lowered in time to avoid an accident. Thus, it has become paramount that some apparatus be devised for providing some assurance that a closed hydraulic system does not contain a quantity of air which will cause the system to malfunction.

In the prior art it is customary to fill the hydraulic system with a fluid while simultaneously bleeding the same from the system at the same rate, thereby allowing the air to escape as the fluid is forced into the system. This technique is an arduous and an exacting one, requiring an extremely long period of time independent of whether the system is small or large. Upon the conclusion of filling the system in this manner, there is no simple and easy way of knowing the degree to which the air has been removed and there are no known devices heretofore capable of measuring the amount of air included in the closed system so as to provide the necessary assurance that the system will operate with optimum efficiency. In general, the system is subjected to an operational test which may or may not reveal the presence of too much air in the system that may cause it to become malfunctioning. The presence of too much air in the system is evidenced by the fact that many systems have been tested at their point of manufacture or repair and subsequently found to be malfunctioning when an attempt has been made to make the system operational. Thus, it can be seen that prior art methods and apparatus are not adequate to solve these problems.

The present invention obviates the foregoing and other problems and disadvantages experienced in the prior art by providing a method and apparatus which may be employed readily for measuring the precise volume of gas included in any closed hydraulic system in which the presence of gas may cause problems. Once it has been determined, either experimentally or by calculation, what quantity of gas (air in the present example) will be detrimental to operation of the system, the present invention is a useful tool for readily determining whether or not the volume of gas remaining in a particular system is below the minimum level required for optimum operation.

In more particular detail, the invention comprises a method whereby apparatus may be connected to the hydraulic system without the inclusion of any signficant amount of air to the system upon its connection thereto or its removal therefrom. The apparatus used for determining the volume of air in a closed system comprises a unique quick-disconnect coupling device which is connected to one end of one branch of a manifold device and a volume measuring device and valve connected to the other end of the same branch of the manifold device. The other branch of the manifold device has a pressure gauge and needle valve connected thereto for measuring the pressure of the fluid in the system. The two branches of the manifold device may be separated by a flexible diaphragm member which is responsive to compression effects applied to the fluid in the system. In practice, it has been found that the present invention is readily adaptable to a wide variety of uses. In a matter of minutes, the present invention may be utilized to determine the precise volume of air contained in a particular system thereby indicating whether or not the system will operate with optimum satisfaction.

Accordingly, it is the broad objective of this invention to provide an improved method and apparatus for implementing the removal of excessive entrapped gas in a closed hydraulic system.

Another object of the invention is to provide a composite apparatus adapted to determine the volume of entrapped gas in a closed hydraulic system.

Still another object of the invention is to provide a precise indication of the volume of gas entrapped in a closed hydraulic system with a substantial reduction in the time and cost of making such a determination.

Yet another object of the invention is to provide an apparatus useful in making a rapid determination of the volume of entrapped gas in a closed hydraulic system while simultaneously avoiding the inclusion of air or oil spillage during such determination.

Still another object of the invention is to provide an improved method for reducing the time and cost of filling the hydraulic system.

The novel features which are believed to be characteristic of the invention, both as to its organization and method of construction and operation, together with the objects and advantages thereof, will be better understood with the following description considered in connection with the accompanying drawing in which an illustrative embodiment of the invention is displayed by way of example. It is expressly understood, however, that the drawing is for purposes of illustration and description only, and does not define limitations within the invention.

In the drawing:

The figure is a diagrammatic view of an apparatus for facilitating the partial removal of excess trapped air in a hydraulic system and for measuring the remaining volume of entrapped air in the system according to the invention.

With reference to the drawing, FIGURE 1 shows a quick disconnect coupling valve 10 and a hydraulic pressure fluid supply line 12 connected to the high pressure side of an air-tight hydraulic system 14 to provide a supply of hydraulic fluid and for compressing the fluids of the hydraulic system 14. An air measuring apparatus generally designated 16 is connected to the low pressure side of the hydraulic system 14 at a valve connection 18 which may be one-half of the self-sealing disconnect 20. Apparatus 16 comprises a quick disconnect coupling 20 connected to one end of one branch of a manifold 22 through tube 24, a slow bleed valve 26 connected to the other end of the same branch of manifold 22 which is in turn connected to one arm of a T-shaped tube 28 which in turn has the other arm of the T-shaped tube 28 connected to a cylindrical tube 30 having a predetermined length and inside diameter. The leg of the T-shaped tube member 28 is connected to one side of an on-off valve 32 which is in turn connected at the other side to a drained tube 34. The other branch of the manifold has a fluid supply inlet valve 36 connected to one end thereof, while at the other end thereof there is connected a gauge valve 38, a pressure gauge 40, connected thereto through a pressure gauge tube 42 to complete this branch of the apparatus. The apparatus is completed by a linear scale 44 having incremental markings thereon and attached by any suitable means to the cylindrical tube 30 for ready reference in determining the height of rise of a fluid 45 in the tube during the operation of the apparatus.

Referring now more particularly to the individual components of the apparatus, attention is first directed to quick disconnect coupling 20, which may be any suitable device such as that produced by the Seaton-Wilson Manufacturing Company, Burbank, California, and disclosed in United States Patent 3,073,342 issued January 15, 1963, which is capable of being coupled to an enclosed hydraulic system permitting only 0 to $10^{-5}$ cubic inches of air inclusion and less than 0.1 drop of spillage per disconnect. It will be appreciated by those versed in the art that the use of such a coupling device is desirable during the process of making a test for the volume of air included in the system so as to avoid or to minimize the amount of air let into the closed system after determination of the volume of air contained therein is made.

Continuing with the discussion of the apparatus 16, manifold 22 consists of a first manifold block 46 to which gauge 40 is connected and a second manifold block 48 to which the cylindrical tube is connected. As shown in the drawing, each block has an indentation formed therein generally designated 50 in the instance of the first manifold block and 52 in the instance of the second manifold block, and a series of passages which cooperate with the other components connected to these blocks. These manifold block members are connected together to form an air-tight system and are separated by a flexible diaphragm 54 which may be constructed of any suitable material such as a rubber-like substance; for example, preferably a composition resistant to chemical action of oil, alcohol, and various other fluids employable in hydraulic systems and may also be made from a suitable synthetic plastic material such as vinyl resin and the like. The primary function of the diaphragm 54 is to provide an apparatus which is responsive to the compressive forces applied to the fluids utilized in the hydraulic system and yet not allow a possible interchange of air. It will be apparent to those versed in the art that the slightest increase in compression of fluids on either side of the diaphragm will be readily communicated to the other side of the diaphragm without any discrepancy or errors in pressure. The diaphragm also acts to prevent any contamination which may exist in the system from being accumulated in the branch of the gauge, thereby to cause any erroneous readings in the value of pressure indicated. The coupling 36 and valve 38 are useful in connection with filling and bleeding the gauge branch of the system during the process of calibrating the gauge. The gauge 40 may be any suitable commercially available gauge which employs a "Bourdon Tube" mechanically coupled to an indicator needle for reading the pressure exerted on the gauge. The gauge 40 shown in the drawing has been modified by the presence of a bleed tube 56 and the bleed tube screw 58 which are used for bleeding the gauge during the calibration of the gauge 40.

A slow bleed valve 26 is connected to the other end of manometer block 52 and should be a valve which permits the fluid to flow therethrough at a relatively slow rate since it is used to lower the pressure of the hydraulic system during the test thereof for included air. The cylindrical tube 30 connected to one arm of the T-shaped tube 28 may be any suitable translucent tube such as a manometer tube, which may be readily observed to determine the height of fluid 45 therein as it is released from the hydraulic system through the measuring apparatus. In the preferred embodiment of the invention, the inside diameter of the tube has been selected to have a value of 0.25 inch. This diameter has been found satisfactory for easy reading and substantially conforms to the size of readily available tubing which would be suitable for this purpose. However, it may be any size convenient for an application. The graduations depicted on the linear scale 44 may be of any convenient dimension such as inches, so long as the values thereof are readily useful in determining the volume of fluid contained in the piezometer tube.

Before discussing the operation of the device, it is believed that a short discussion of the principles controlling the operation of the device would be beneficial for a more thorough understanding of its operation. In general, the present invention owes its fundamental operation to effects of pressure on a confined gas in accordance with "Boyle's Law," which is concerned with the compressible properties of gas. It is well known if a gas is confined within a closed system having a tight fitting piston, then applying a force thereto, the piston will move inward and come to rest at some new position where the pressure set up within the gas equals that exerted upon it by the piston. During this process, the gas is compressed and its volume reduced. Robert Boyle (1627–1691), an English philosopher, found a very simple relation between the pressure of a gas and its volume which is known as "Boyle's Law"; namely, that the volume of a confined body of gas varies inversely as the absolute pressure, provided the temperature remains unchanged. If P and V represent, respectively, the pressure and volume of the gas under one condition, and $P_1$ and $V_1$ its pressure and volume under some different condition, then $V:V_1$ equal $P_1:P$, or stated differently, $pV=p_1V_1$. The term "pressure" means either the pressure exerted by the gas or the external pressure applied to it, since these values are numerically equal. A perfect gas is one which may be defined as one which conforms to Boyle's Law, and it is assumed that the fluid used in the system disclosed by the present invention is approximately a perfect fluid.

With the foregoing discussion in mind, the operation of the apparatus shown in FIGURE 1 will be discussed. Operation of apparatus 16 is commenced by selecting an air-tight hydraulic system having certain known internal characteristics. More particularly, it is necessary to know whether or not the hydraulic system has components included therein which will give false impressions as to the quantity of air contained therein. For example, if a hydraulic system to be tested has one or more components such as a spring or O-rings which may be compressed along with the compression of the fluid, the expansion of these components when the compressive forces are removed may give a false indication of the quantity of air within the package. With a knowledge of the compressive effects of these components well in mind, the method for conducting a test with apparatus 16 can be adapted to compensate for such effects and thereby provide a substantially accurate reading of the exact amount of the air contained in a package. Thus, a typical test of vacuum tight hydraulic system 14 proceeds by first filling the system with a suitable hydraulic fluid by the conventional bleeding technique, as discussed hereinabove, until the system is substantially free of entrapped air. Next, apparatus 16 is connected to the low pressure side of the package at connection point 18 by means of quick disconnect coupling valve 20 and quick disconnect coupling valve 10 is connected to the high pressure side of air tight hydraulic system 14. Through the use of a high pressure fluid supply apparatus which has not been shown, additional fluid is pumped through high pressure fluid supply line 12 to thereby compress the fluids in the system to a predetermined pressure. During this compression step, the valves 20 and 38 are open while all other valves are closed and remain so until they are opened by manual operation.

In this illustrative embodiment of the invention, the fluid in the system is compressed initially to a pressure of 60 pounds per square inch (p.s.i.) as indicated on the pressure gauge 40. Prior to stabilizing the system, at the initial setting of 60 p.s.i., valve 26 may be opened several times to allow the fluid in the hydraulic system 14 to purge itself of as much additional air as possible by permitting some of the fluid to flow past valve 26 into the cylindrical tube 30 for visual inspection. In practice it has been found that the fluid which rises in the tube 30 will become substantially clear, indicating that there remains a minimum amount of air in the system. Once the operator is satisfied that the fluid is substantially free of minute air bubbles, valve 26 is closed and drain valve 32 is opened to permit drainage of the fluid from the tube 30 and is thereafter closed. The fluid bled from the system is replaced through high pressure line 12 and the pressure of the system is again raised to 60 p.s.i. as indicated by gauge 40.

Next, slow bleed valve 26 is opened to thereby reduce the pressure on the fluid in the system to a value at 29.4 p.s.i. whereat it is closed again. After this operation, drain valve 32 is again opened to drain the fluid from the cylindrical tube 30 and to establish a zero reference level at the bottom of the tube whereat it is closed again.

At this point in the operation, reference is made to the discussion of "Boyle's Law" and the equation $PV=P_1V_1$. With a pressure of 29.4 pounds per square inch gauge (p.s.i.g.), the pressure read on the pressure gauge 40, the absolute pressure ($p$) is 44.1 (e.g. 3 atmospheres) while the associated volume is unknown and $P_1$ and $V_1$ are unknown. By opening valve 26 and permitting the system to go to atmospheric pressure (14.7 p.s.i. or 1 atmosphere) $P_1$ is thereby established, and $V_1$ is determined by calculating the area of the opening in tube 30 and the height to which the fluid rises in tube 30. In this illustrative embodiment of the invention, the inside diameter of the piezometer tube is ¼ of an inch, which gives a cross-sectional area of $\pi$ over 64 inch and the height in inches to which the fluid rises in the tube is read directly. Referring again to Boyle's equation, it can readily be seen that the unknown volume of air in the air-tight hydraulic system 14 may be readily calculated as follows:

$$PV=P_1V_1 \quad (1)$$

where $P=3$ atmospheres and $P_1=1$ atmosphere $$3V=V_1 \text{ or } V=\tfrac{1}{3}V_1 \quad (2)$$

The change in volume after opening valve 26 is the following equation:

$$V+\Delta V=V_1 \text{ or } \Delta V=V_1-V \quad (3)$$

Substituting Equation 2 in Equation 3 gives the following equation:

$$\Delta V=V_1-\tfrac{1}{3}V_1 \text{ or } \Delta V=\tfrac{2}{3}V_1 \text{ or } V_1=3/2\Delta V \quad (4)$$

Since the change in volume of gas in the package under test is equal to the volume of the liquid displaced in cylindrical tube 30 the volume $V_1$ may be determined as follows:

$\Delta V$=Area of tube 30(A)×Height of liquid in tube (H)

Thus:

$$V_1=3/2\Delta V=3/2(A)(H)$$

where $(A)=\pi/64$ for a ¼ inch diameter tube 30
Then:

$$V_1=\frac{3\pi}{128}(H)=0.0735\,(H)$$

Thus, from the foregoing example, it can be seen that 0.0735 is a constant ($k$) for a final reading of 29.4 on pressure gauge 40, and, therefore, the volume of air contained in the air-tight hydraulic system 14 is determined by multiplying this constant ($k$) by the height (H) to which the fluid rises in the cylindrical tube 30.

It should be noted at this point that the pressure values selected in conducting a test of a package may be varied depending upon the factors discussed hereinabove with respect to the compressible characteristics of the components contained in the closed hydraulic system.

Thus, it will be appreciated that these values will vary from case to case. For example, assume that the components of system 14 exert a pressure effect of 5 pounds per square inch gauge (p.s.i.). The gauge 40 setting should be 34.4 p.s.i.g. instead of the 29.4 p.s.i.g. for the example set forth hereinabove and valve 26 would be closed at a reading of 5 p.s.i. on the gauge which would give the same reading for the quantity of air illustrated in the foregoing example.

Attention is directed to a second valve 60 which may be identical to valve 20. The purpose of the addition valve in the horizontal position will permit apparatus 16 to be connected to a hydraulic system which has its connection part similar to part 18 located in a position convenient for connecting valve 20. In addition, valve 60 may be used as a convenience outlet in bleed system 14 while under pressure. For example, if it is determined that more than the predetermined minimum of air remains in the system after testing, it may be expeditious to bleed the system while under pressure to further purge the system. Thus, it may readily be seen that the presence of the second valve 60 adds to the versatility of apparatus 16.

It should also be noted at this point that the apparatus shown in FIGURE 1 may be modified by replacing the pressure gauge 40 where another pressure metering device, such as a manometer, which would resemble the cylindrical tube 30 and linear scale 44 shown in FIGURE 1. Such a modification in the apparatus would require the presence of a large quantity of fluid in the branch of the system to which the gauge 40 is connected. In addition, the indentation 50 of the manifold block 46 would have to be enlarged considerably in order to provide space for storing a quantity of fluid within the system capable of filling a cylindrical tube to a level corresponding to the pressure exerted thereon. Thus, it may be concluded that the method disclosed herein for making such a measurement is not limited by the specific apparatus disclosed herein, but should be interpreted as having much broader application.

More particularly, the method set forth herein could foreseeably be performed with apparatus different from that disclosed by the preferred embodiment of the present invention. For example, it would be possible to use several separate devices, such as a pressure measuring device, solely for determining the pressure of hydraulic system 14 and an apparatus for measuring the volume of fluids removed therefrom in determining the volume of entrapped air. Obviously such a procedure would not be as convenient, expeditious and exacting as has been experienced with the apparatus of the preferred embodiment disclosed herein.

In closing, it is useful to summarize some of the advantages of the present invention. One such advantage involves the use of apparatus 16 as an aid to failure analysis of an air-tight hydraulic system as a first check before opening the package for repair of an apparent internal component failure.

In practice, it has been found that many initial diagnoses of internal component failures have subsequently proven to be only due to the presence of included air. Thus, the present invention is extremely useful as an aid in failure analyses and the subsequent repair of a malfunctioning unit in that it may reduce the time and cost involved in making such repairs by eliminating the necessity of tearing down the units to determine the cause of malfunction.

Another advantage of the present invention arises from the reduction of time required to fill the package by initially indicating the volume of air contained in a package, thereby eliminating the necessity for running the unit under simulated conditions in order to determine whether or not it is an operational system. In this manner, considerable cost and time may be saved by utilizing the present invention.

Still another advantage of the present invention arises from the fact that the elimination of air in a given package below some established minimum will, to a large degree, eliminate the possibility of certain internal components failing due to the presence of air within the system. Thus, there are several savings in this case; namely, the time and cost of tearing down the unit to replace a damaged part, the cost involved in replacing a damaged unit, and the time involved in rebuilding and refilling the unit so as to put it in an operable condition.

The foregoing advantages are only illustrative of many of the advantages which may be derived from the present invention, and many more will become obvious to those versed in the art.

It is understood that the above-described embodiments are only illustrative of the principles applicable in the invention. Numerous other arrangements and modifications may be defined by those skilled in the art without departing from the spirit and scope of the invention. Thus, by way of example, and not limitation, manifold block 22 may be omitted, and the gauge 40 and the cylindrical tube 30 branches connected to a common line. In such an arrangement, the pressure from the hydraulic system would flow directly to the gauge during each test. It should be noted at this point, however, that such an arrangement would not provide all of the advantages of the preferred embodiments of the invention, in that the liquid line to the gauge may collect contamination or air from the hydraulic system after several tests, and, therefore, may cause errors in the measurement or require draining of the system after each test. Accordingly, it is to be understood that the present invention is limited only by the spirit and scope of the appended claims.

What is claimed is:

1. In an apparatus adapted for measuring the quantity of gas entrapped in a separate closed hydraulic system, the combination comprising: first means for communicating the pressure effects of a fluid and fluid therein under compression uniformly through each of two cooperating branches; valve means connected to one branch of said first means for passing or blocking the flow of said fluid in said one branch; gauge means connected to the other branch of said first means for measuring the pressure exerted on the fluids and gas of the hydraulic system; volume measuring means connected to said second means to determine the volume of gas included in the hydraulic system which is related to the volume of fluid measured with said measuring means; and an on-off valve and associated drain tube connected to said on-off valve which is in turn connected between said valve means and said volume measuring means for removal of fluids from said measuring means.

2. An apparatus for measuring the quantity of air entrapped in an air-tight hydraulic system containing fluids, the combination comprising: a first means for connecting and disconnecting said apparatus to the hydraulic system, second means connected to said first means for communicating the pressure effects of a fluid under compression uniformly to each of two cooperating branches, gauge means connected to one branch for measuring the pressure of fluids under compression in the hydraulic system and cylindrical tube means connected to the other branch for measuring the volume of fluids removed from the hydraulic system as the compression of the fluids of the system decreases to a preselected pressure to thereby determine the volume of entrapped air in the system.

3. An apparatus for removing a portion of the fluid from an air-tight hydraulic system to measure the quantity of gases entrapped therein, the combination comprising first means for connecting and disconnecting said apparatus to the hydraulic system, second means connected to said first means for communicating the pressure effects of a fluid under compression uniformly to each of two cooperating branches, gauge means connected to one branch for measuring the pressure of fluids under compression in the hydraulic system and cylindrical tube means connected to the other branch for measuring the volume of fluids removed from the hydraulic system as the compression of the fluid of the system is decreased to atmospheric pressure to thereby determine the volume of entrapped air in the system.

4. An apparatus for measuring the quantity of air entrapped in a closed hydraulic system containing fluids, the combination comprising: first means for connecting and disconnecting said apparatus to a hydraulic system with minimum air inclusion and fluid spillage; second means for communicating the pressure effect of a fluid under compression uniformly to each of two cooperating branches; valve means connected to one branch of said second means for passing or blocking the flow of said fluid in said one branch in response to a manual operation; gauge means connected to the other branch of said second means through said valve means for measuring the pressure exerted on the fluid of the hydraulic system; measuring means connected to said one branch of said second means through said valve means for determining the volume of air included in the hydraulic system which is related to the volume of fluid measured with said measuring means; and an off-on valve and associated drain tube connected to said valve which is in turn connected between said valve means and said measuring means for removal of fluids from said measuring means.

5. An apparatus for measuring the quantity of gases entrapped in air-tight hydraulic systems containing fluids, the combination comprising: first means for connecting and disconnecting said apparatus to a hydraulic system with minimum air inclusion and fluid spillage; second means for communicating the pressure effects of a fluid under compression in said hydraulic system uniformly to each of two cooperating branches which are separated by a flexible diaphragm responsive to the effects of said fluid; valve means connected to one branch of said second means for passing or blocking the flow of said fluid in said branch; a gauge connected to the other branch of said second means for measuring the pressure exerted on the fluids of said hydraulic system; measuring means connected to said one branch of said second means for determining the volume of air included in said hydraulic system which is related to the volume of fluid measured with said measuring means; and an off-on valve and associated drain tube connected between said valve means and said measuring means for removal of fluid from said measuring means.

6. A hydraulic fluid measuring apparatus for measuring the quantity of air entrapped in a closed hydraulic system containing fluids, the combination comprising: a quick disconnect coupling valve for connecting and disconnecting said apparatus to the hydraulic system with minimum air inclusion and fluid spillage; a manifold arrangement connected to said quick disconnecting coupling valve for communicating a pressure effect of a fluid under compression in the closed hydraulic system uniformly to each of two cooperating branches thereof which are separated by a flexible diaphragm responsive to the action of said fluid; a manually operated valve connected to one branch of said manifold arrangement for passing or blocking the flow of said fluid in said one branch; a gauge means connected to the other branch of said manifold arrangement through a second valve for measuring the pressure exerted on the fluid on the hydraulic system; a cylindrical tube and scale connected to said one branch of said manifold arrangement through said manually-operated valve for measuring the volume of air included in the hydraulic system which is related to the volume of fluid measured with said cylindrical tube; and a series-connected on-off valve and associated drain which is in turn connected between said manual valve and said cylindrical tube for removal of fluids from said cylindrical tube.

References Cited by the Examiner

UNITED STATES PATENTS

| | | | |
|---|---|---|---|
| 2,635,459 | 4/1953 | Gray | 73—19 |
| 2,736,190 | 2/1956 | Bockelmann et al. | 73—19 |

RICHARD C. QUEISSER, *Primary Examiner.*

DAVID SCHONBERG, *Examiner.*

LAWRENCE R. FRANKLIN, *Assistant Examiner.*

UNITED STATES PATENT OFFICE
CERTIFICATE OF CORRECTION

Patent No. 3,225,585                        December 28, 1965

George J. Wohnoutka

It is certified that error appears in the above identified patent and that said Letters Patent are hereby corrected as shown below:

Column 7, lines 65 and 66, "second" should read -- valve --.

Signed and sealed this 17th day of March 1970.

(SEAL)
Attest:

Edward M. Fletcher, Jr.                    WILLIAM E. SCHUYLER, JR.
Attesting Officer                             Commissioner of Patents